US012068534B2

(12) United States Patent
Wang et al.

(10) Patent No.: US 12,068,534 B2
(45) Date of Patent: Aug. 20, 2024

(54) ANTENNA UNIT, PREPARATION METHOD THEREFOR, AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 264 days.

(21) Appl. No.: 17/635,702

(22) PCT Filed: Mar. 23, 2021

(86) PCT No.: PCT/CN2021/082472
§ 371 (c)(1),
(2) Date: Feb. 16, 2022

(87) PCT Pub. No.: WO2022/198460
PCT Pub. Date: Sep. 29, 2022

(65) Prior Publication Data
US 2023/0344118 A1 Oct. 26, 2023

(51) Int. Cl.
*H01Q 1/48* (2006.01)
*H01Q 1/38* (2006.01)
*H01Q 1/50* (2006.01)

(52) U.S. Cl.
CPC ................. *H01Q 1/48* (2013.01); *H01Q 1/38* (2013.01); *H01Q 1/50* (2013.01)

(58) Field of Classification Search
CPC .. H01Q 1/48; H01Q 1/38; H01Q 1/50; H01Q 1/243; H01Q 13/10
See application file for complete search history.

(56) References Cited

U.S. PATENT DOCUMENTS 10,431,899 B2 * 10/2019 Bily ........................ H01Q 21/20
10,811,784 B2 * 10/2020 Sikes ........................ H01Q 1/48
(Continued)

FOREIGN PATENT DOCUMENTS

CN 107636896 A 1/2018
CN 108321541 A * 7/2018 ............... H01Q 1/38
(Continued)

OTHER PUBLICATIONS

You Lan et al., "K-band Liquid-crystal-based Frequency and Pattern Reconfigurable Linear Antenna Array," 2018 IEEE MTT-S International Wireless Symposium (IWS), May 10, 2018.

*Primary Examiner* — Seung H Lee
(74) *Attorney, Agent, or Firm* — Ling Wu; Stephen Yang; Ling and Yang Intellectual Property

(57) ABSTRACT

An antenna unit includes: a first substrate, a second substrate, and a third substrate which are stacked. The second substrate has a first slotted area. A liquid crystal layer is arranged in a cavity formed by the first substrate, the first slotted area of the second substrate, and the third substrate. The first substrate includes: a first base substrate, a ground layer on one side of the first base substrate close to the second substrate, and a feed structure layer on one side of the first base substrate away from the second substrate. Orthogonal projections of the ground layer and the feed structure layer on second substrate overlap with an orthogonal projection of first slotted area on the second substrate. The third substrate includes: a third base substrate, and a radiation structure layer on one side of the third base substrate close to the second substrate.

20 Claims, 7 Drawing Sheets

(56) References Cited

U.S. PATENT DOCUMENTS

| | | | |
|---|---|---|---|
| 2016/0261042 | A1 | 9/2016 | Sazegar et al. |
| 2018/0233821 | A1 | 8/2018 | Pham et al. |
| 2019/0363452 | A1 | 11/2019 | Ting et al. |
| 2020/0295457 | A1 | 9/2020 | Yasuo et al. |

FOREIGN PATENT DOCUMENTS

| | | | |
|---|---|---|---|
| CN | 108615966 | A | 10/2018 |
| CN | 108767456 | A | 11/2018 |
| CN | 109964365 | A | 7/2019 |
| WO | 2017155084 | A1 | 9/2017 |

* cited by examiner

ANTENNA UNIT, PREPARATION METHOD THEREFOR, AND ELECTRONIC DEVICE

CROSS-REFERENCE TO RELATED APPLICATIONS

The present application is a U.S. National Phase Entry of International Application PCT/CN2021/082472 having an international filing date of Mar. 23, 2021. The entire contents of the above-identified application are hereby incorporated by reference.

TECHNICAL FIELD

The present disclosure relates to, but is not limited to, the technical field of communication, and in particular to an antenna unit, a method for preparing the antenna unit, and an electronic device.

BACKGROUND

As an important part of mobile communication, research and design of an antenna play a vital role in mobile communication. However, a biggest change brought by the fifth generation (5G) mobile communication technology is innovation of user experience, and signal quality in a terminal device directly affects the user experience, therefore design of an antenna for a 5G terminal will become an important link of 5G deployment. However, spectrum distribution of 5G communication all over the world is not uniform, a bandwidth of an antenna in the related art is narrow, and it is difficult to cover various spectra of 5G communication, which brings great challenges to design of the antenna.

SUMMARY

The following is a summary of subject matters described herein in detail. This summary is not intended to limit the scope of protection of the claims.

Embodiments of the present disclosure provide an antenna unit, a method for preparing the antenna unit, and an electronic device.

In one aspect, an embodiment of the present disclosure provides an antenna unit, including a first substrate, a second substrate, and a third substrate that are stacked. The second substrate has a first slotted area. A liquid crystal layer is arranged in a cavity formed by the first substrate, the first slotted area of the second substrate, and the third substrate. The first substrate includes: a first base substrate, a ground layer on one side of the first base substrate close to the second substrate, and a feed structure layer on one side of the first base substrate away from the second substrate. An orthogonal projection of the ground layer and the feed structure layer on the second substrate overlaps with an orthogonal projection of the first slotted area on the second substrate. The third substrate includes: a third base substrate, and a radiation structure layer on one side of the third base substrate close to the second substrate. An orthogonal projection of the radiation structure layer on the second substrate is within the orthogonal projection of the first slotted area on the second substrate.

In some exemplary implementation modes, the ground layer has a second slotted area. An orthogonal projection of the second slotted area on the second substrate is within the orthogonal projection of the first slotted area on the second substrate, and an overlapping area between the orthogonal projections of the radiation structure layer and the feed structure layer on the second substrate overlaps with the orthogonal projection of the second slotted area on the second substrate.

In some exemplary implementation modes, the feed structure layer includes: a feed part, and grounding electrodes on two opposite sides of the feed part. An orthogonal projection of the feed part on the second substrate overlaps with the orthogonal projection of the first slotted area on the second substrate. Multiple metalized via holes are formed in the first base substrate. The grounding electrodes are electrically connected to the ground layer through the multiple metalized via holes.

In some exemplary implementation modes, in a first direction, a center line of the feed part of the feed structure layer substantially coincides with a center line of the second slotted area of the ground layer. The first direction is perpendicular to an extension direction of the feed part.

In some exemplary implementation modes, at least one through hole is formed in the third base substrate. An orthogonal projection of the at least one through hole on the second substrate is within the orthogonal projection of the first slotted area on the second substrate, and does not overlap with an orthogonal projection of the radiation structure layer on the second substrate.

In some exemplary implementation modes, an insulating layer is arranged on one side of the ground layer away from the first base substrate. An orthogonal projection of the insulating layer on the first base substrate includes an orthogonal projection of the second slotted area of the ground layer on the first base substrate.

In some exemplary implementation modes, a thickness of the insulating layer is less than or equal to that of the ground layer.

In some exemplary implementation modes, a first electrode connected to the radiation structure layer is further arranged on the side of the third base substrate close to the second substrate. A second electrode connected to the ground layer is further arranged on the side of the first base substrate close to the second substrate. Orthogonal projections of the first substrate and the second substrate on the third substrate do not overlap with the first electrode. Orthogonal projections of the third substrate and the second substrate on the first substrate do not overlap with the second electrode.

In some exemplary implementation modes, the first electrode and the radiation structure layer are in an integrated structure. The second electrode and the ground layer are in an integrated structure.

In some exemplary implementation modes, the first base substrate, a second base substrate of the second substrate, and the third base substrate are flexible substrates.

In another aspect, an embodiment of the present disclosure provides an electronic device, including the antenna unit as described above.

In another aspect, an embodiment of the present disclosure provides a method for preparing an antenna unit, including: forming a first substrate, wherein the first substrate includes: a first base substrate, and a feed structure layer and a ground layer on two opposite sides of the first base substrate; forming a second substrate having a first slotted area; forming a third substrate, wherein the third substrate includes: a third base substrate, and a radiation structure layer; stacking the first substrate, the second substrate, and the third substrate, so that the second substrate is located between the first substrate and the third substrate, the ground layer faces the radiation structure layer, an orthogonal projection of the radiation structure layer on the second substrate is within an orthogonal projection of the first slotted area on the second substrate, and an orthogonal projection of the ground layer and the feed structure layer on the second substrate overlaps with the orthogonal projection of the first slotted area of the second substrate; and filling a liquid crystal material in a cavity formed by the first substrate, the first slotted area of the second substrate, and the third substrate, so as to form a liquid crystal layer.

In some exemplary implementation modes, stacking the first substrate, the second substrate, and the third substrate includes: pressing the third substrate, the second substrate, and the first substrate in a staggered manner, and exposing a first electrode which is arranged on the third base substrate and connected to the radiation structure layer and a second electrode which is arranged on the first substrate and connected to the ground layer.

After the accompanying drawings and detailed descriptions are read and understood, other aspects may be understood.

BRIEF DESCRIPTION OF DRAWINGS

Accompanying drawings are used to provide further understanding of technical solutions of the present disclosure, constitute a part of the specification, and are used to explain the technical solutions of the present disclosure together with the embodiments of the present disclosure, but do not constitute a limitation on the technical solutions of the present disclosure. Shapes and sizes of one or more components in the accompanying drawings do not reflect actual scales and are only intended to illustrate the contents of the present disclosure.

DETAILED DESCRIPTION

Figure 1:
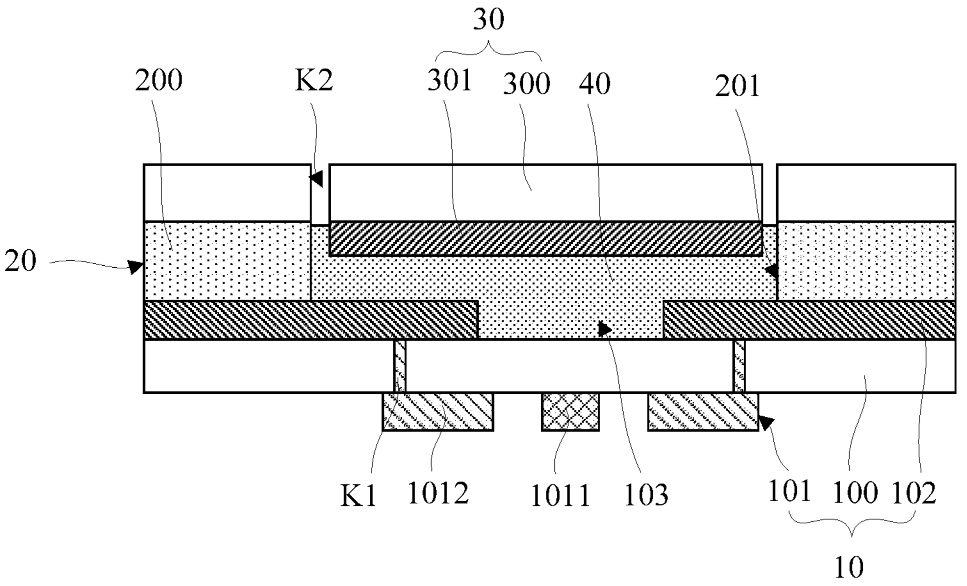
FIG. 1 illustrates a schematic cross-sectional view of an antenna unit of at least one embodiment of the present disclosure.

The embodiments of the present disclosure will be described in detail below with reference to the accompanying drawings. Implementation modes may be implemented in multiple different forms. It will be readily appreciated by those of ordinary skills in the art that the implementation modes and contents may be changed into one or more forms without departing from the spirit and scope of the present disclosure. Therefore, the present disclosure should not be construed as only being limited to the contents described in the following embodiments. The embodiments in the present disclosure and the features in the embodiments may be combined randomly with each other if there is no conflict.

In the accompanying drawings, a size of a constituent element, and a thickness or an area of a layer is sometimes exaggerated for clarity. Therefore, one implementation mode of the present disclosure is not necessarily limited to dimensions and shapes and sizes of multiple components in the accompanying drawings do not reflect actual scales. In addition, the accompanying drawings schematically show an ideal example, and one implementation mode of the present disclosure is not limited to the shape, value, or the like shown in the accompanying drawings.

Ordinal numerals such as "first", "second" and "third" in the present disclosure are set to avoid confusion between constituent elements, but are not intended to limit in terms of quantity. "Multiple" in the present disclosure means a quantity of two or more.

In the present disclosure, for convenience, wordings indicating orientations or positional relationships, such as "center", "upper", "lower", "front", "back", "vertical", "horizontal", "top", "bottom", "inside", "outside", and the like are used to describe the positional relationships of the constituent elements with reference to the accompanying drawings, and are merely for facilitating describing the present specification and simplifying the description, rather than indicating or implying that the referred apparatus or element must have a particular orientation, and be constructed and operated in the particular orientation. Thus, they cannot be construed as limitations on the present disclosure. The positional relationships between the constituent elements appropriately change according to directions according to which the constituent elements are described. Therefore, it is not limited to the wordings described in the specification, and can be replaced appropriately according to situations.

In the present disclosure, unless otherwise specified and defined explicitly, terms "mount", "mutually connect", "connect" and the like should be understood in a broad sense. For example, the terms may refer to fixed connection, or detachable connection, or integration. The terms may refer to mechanical connection or electrical connection. The terms may refer to direct mutual connection, may also refer to indirect connection through a middleware, and may refer to internal communication between two components. For those of ordinary skills in the art, meanings of the above-mentioned terms in the present disclosure may be understood according to situations.

In the present disclosure, "electrical connection" includes a situation where constituent elements are connected together by an element with certain electrical effect. There is no specific restriction on "the element with certain electrical effect" as long as they it can send and receive electrical signals between the connected constituent elements.

Examples of "the elements with certain electrical effect" not only includes electrodes or wirings, but also includes switch elements such as transistors, or other functional elements with one or more functions, such as resistors, inductors, capacitors, etc.

In the present disclosure, "parallel" refers to a state in which an angle formed by two straight lines is above −10° and below 10°. Therefore, it may include the state in which the angle is above −5° and below 5°. In addition, "perpendicular" refers to a state in which an angle formed by two straight lines is above 80° and below 100°. Therefore, it may include the state in which the angle is above 85° and below 95°.

"About" and "approximately" in the present disclosure refer to a case where limit is not strictly defined and the process and measurement error ranges are allowed.

At least one embodiment of the present disclosure provides an antenna unit, including a first substrate, a second substrate, and a third substrate which are stacked. The second substrate has a first slotted area. A liquid crystal layer is arranged in a cavity formed by the first substrate, the first slotted area of the second substrate, and the third substrate. The first substrate includes: a first base substrate, a ground layer on one side of the first base substrate close to the second substrate, and a feed structure layer on one side of the first base substrate away from the second substrate. An orthogonal projection of the ground layer and the feed structure layer on second substrate overlaps with an orthogonal projection of first slotted area on the second substrate. The third substrate includes: a third base substrate, and a radiation structure layer one side of the third base substrate close to the second substrate. An orthogonal projection of the radiation structure layer on second substrate is within the orthogonal projection of first slotted area on the second substrate.

This embodiment provides an antenna unit, which is simple in design and stable in performance, and can realize a continuous and reconfigurable resonant frequency. According to this embodiment, the liquid crystal layer is filled through the cavity formed by stacking the three substrates, which can achieve antenna performance meeting communication requirements.

In some exemplary implementation modes, the ground layer has a second slotted area. An orthogonal projection of the second slotted area on the second substrate is within the orthogonal projection of the first slotted area on the second substrate. An orthogonal projection of the radiation structure layer and the feed structure layer on second substrate overlap with the orthogonal projection of the second slotted area on the second substrate. The antenna unit of this exemplary implementation mode uses a feed mode of aperture coupling, which can improve gain and radiation efficiency of an antenna.

In some exemplary implementation modes, the feed structure layer includes: a feed part, and grounding electrodes on two opposite sides of the feed part. An orthogonal projection of the feed part on the second substrate overlaps with the orthogonal projection of the first slotted area on the second substrate. Multiple metalized via holes are formed in the first base substrate. The grounding electrodes are electrically connected to the ground layer through the multiple metalized via holes. The antenna unit of this exemplary implementation mode uses a Grounded Coplanar Waveguide (GCPW) structure for feeding.

In some exemplary implementation modes, in a first direction, a center line of the feed part of the feed structure layer substantially coincides with a center line of the second slotted area of the ground layer. The first direction is perpendicular to an extension direction of the feed part. In this exemplary implementation mode, the impedance matching of a feed port of the antenna unit can be ensured, so as to ensure the antenna performance.

In some exemplary implementation modes, at least one through hole is formed in the third base substrate. An orthogonal projection of the at least one through hole on the second substrate is within the orthogonal projection of the first slotted area on the second substrate, and does not overlap with the orthogonal projection of the radiation structure layer on the second substrate. In this exemplary implementation mode, the at least one through hole is formed in the third base substrate, which can prevent a cavity collapse caused by the bonding of the substrates, and the at least one through hole in the third base substrate may also serve as a crystal filling port for filling a liquid crystal material.

In some exemplary implementation modes, an insulating layer is arranged on one side of the ground layer away from the first base substrate. An orthogonal projection of the insulating layer on the first base substrate includes the orthogonal projection of the second slotted area of the ground layer on the first base substrate. In some examples, a thickness of the insulating layer may be less than or equal to that of the ground layer. However, this embodiment is not limited thereto. In this exemplary implementation mode, the insulating layer is arranged in the second slotted area of the ground layer, which can avoid a cavity collapse caused by electrostatic adsorption in a bonding process of the substrates.

In some exemplary implementation modes, a first electrode connected to the radiation structure layer is further arranged on one side of the third base substrate close to the second substrate. A second electrode connected to the ground layer is further arranged on one side of the first base substrate close to the second substrate. Orthogonal projections of the first substrate and the second substrate on the third substrate do not overlap with the first electrode. Orthogonal projections of the third substrate and the second substrate on the first substrate do not overlap with the second electrode. In some examples, the first electrode and the radiation structure layer may be in an integrated structure. The second electrode and the ground layer may be in an integrated structure. However, this embodiment is not limited thereto. For example, materials of the first electrode and the radiation structure layer may be different, and materials of the second electrode and the ground layer may be different. In this exemplary implementation mode, the third substrate, the first substrate, and the second substrate are arranged in a staggered manner, which can respectively expose the first electrode and the second electrode, so as to apply a bias signal to the first electrode and the second electrode, such as a direct current bias signal, or a low-frequency square wave signal. However, this embodiment is not limited thereto.

In some exemplary implementation modes, the first base substrate, a second base substrate of the second substrate, and the third substrate may all be flexible substrates. However, this embodiment is not limited thereto.

A solution of this embodiment is described below by some examples.

Figure 2:
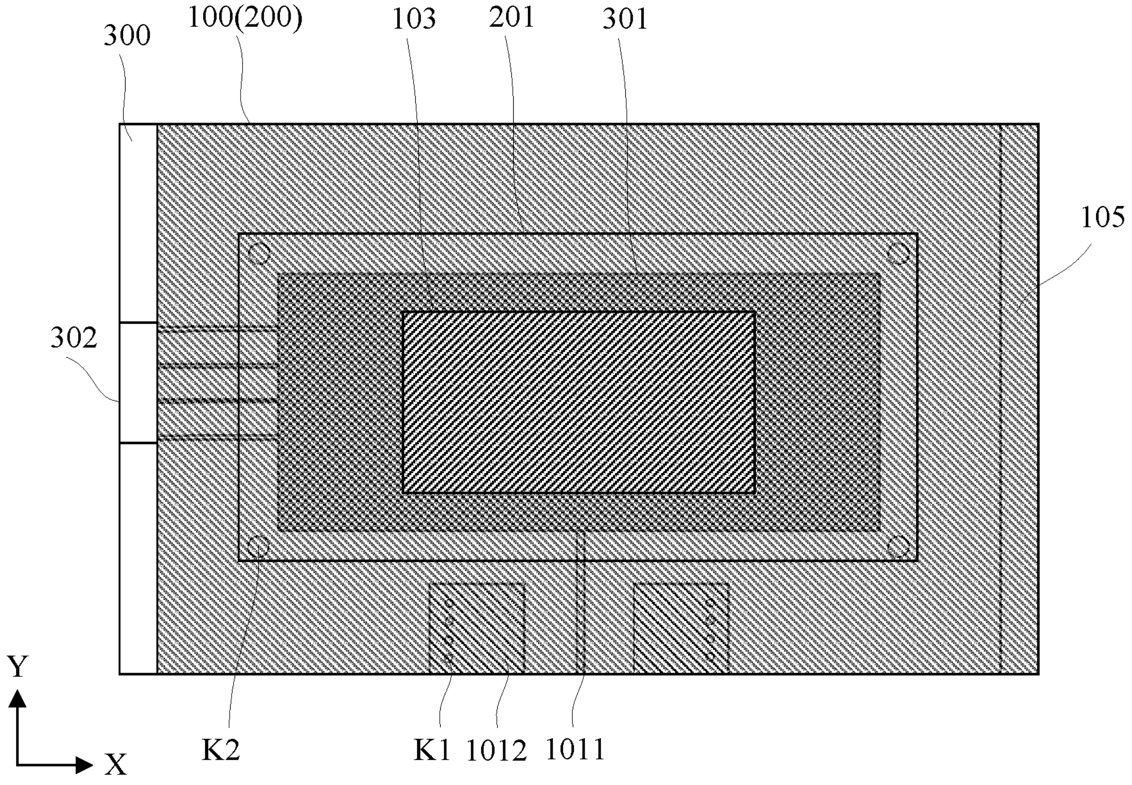
FIG. 2 illustrates a plane schematic diagram of an antenna unit of at least one embodiment of the present disclosure.
Figure 3:
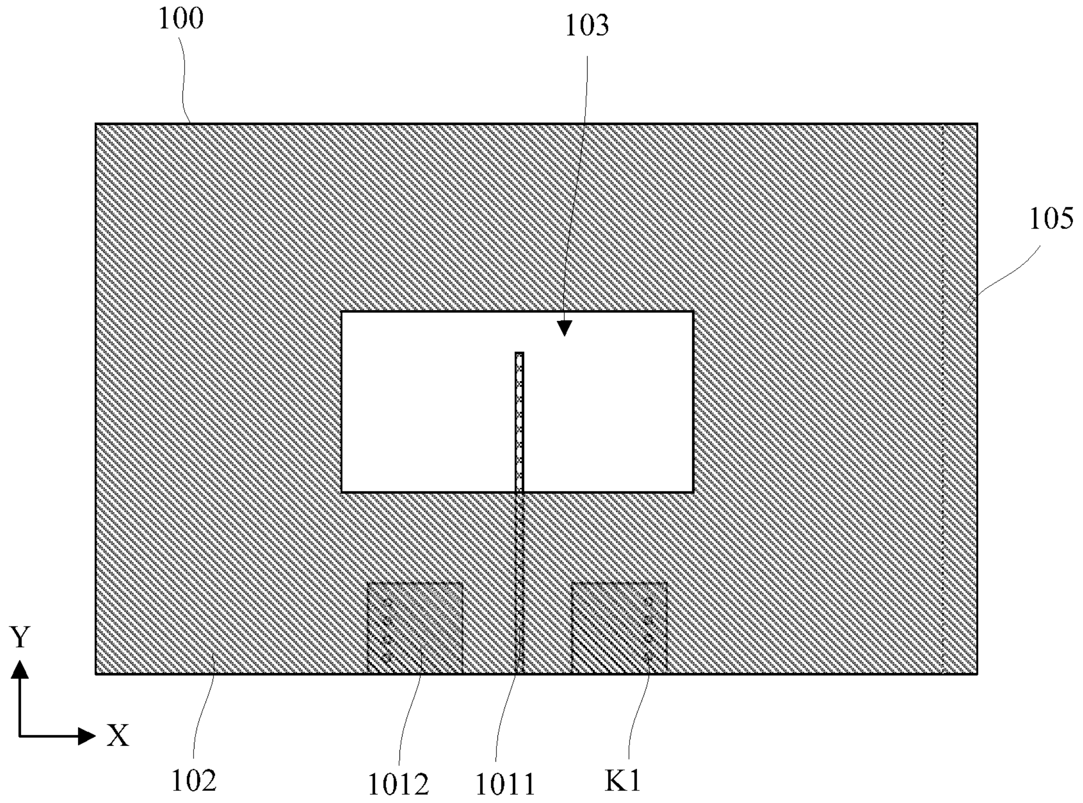
FIG. 3 illustrates a plane schematic diagram of a first substrate of an antenna unit of at least one embodiment of the present disclosure.
Figure 4:
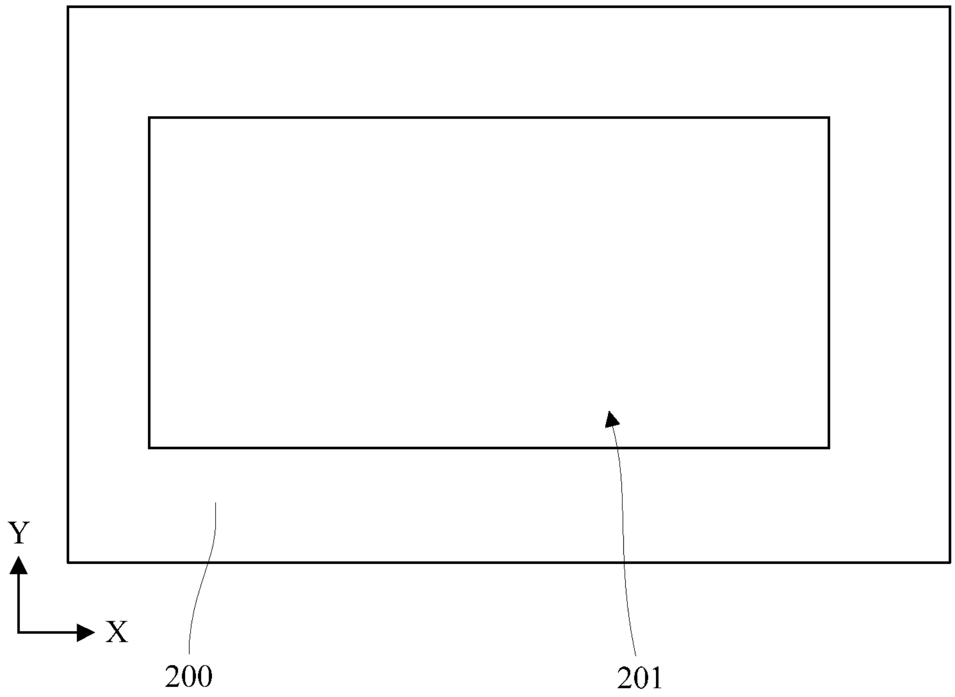
FIG. 4 illustrates a plane schematic diagram of a second substrate of an antenna unit of at least one embodiment of the present disclosure.
Figure 5:
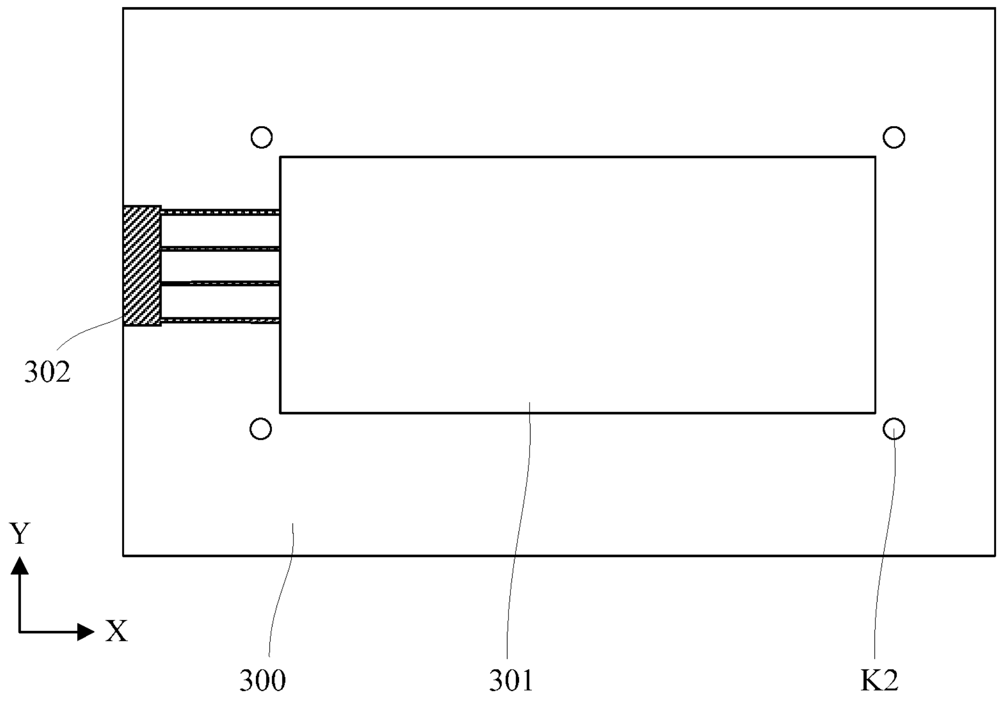
FIG. 5 illustrates a plane schematic diagram of a third substrate of an antenna unit of at least one embodiment of the present disclosure.

FIG. 1 illustrates a schematic cross-sectional view of an antenna unit of at least one embodiment of the present disclosure. FIG. 2 illustrates a plane schematic diagram of an antenna unit of at least one embodiment of the present disclosure. FIG. 3 illustrates a plane schematic diagram of a first substrate of an antenna unit of at least one embodiment of the present disclosure. FIG. 4 illustrates a plane schematic diagram of a second substrate of an antenna unit of at least one embodiment of the present disclosure. FIG. 5 illustrates a plane schematic diagram of a third substrate of an antenna unit of at least one embodiment of the present disclosure.

In some exemplary implementation modes, as shown in FIG. 1 to FIG. 5, the antenna unit of this exemplary embodiment includes: a first substrate 10, a second substrate 20, and a third substrate 30 that are stacked. The second substrate 20 is between the first substrate 10 and the third substrate 30. The second substrate 20 includes: a second base substrate 200. The second base substrate 200 has a first slotted area 201. The first substrate 10, the first slotted area 201 of the second substrate 20, and the third substrate 30 form a cavity, and a liquid crystal layer 40 is arranged in the cavity. Continuous tuning of resonant frequency of an antenna is easily realized by using electrically tunable dielectric properties of the liquid crystal material, and a tuning range is in direct proportion to the tuning ratio of the liquid crystal material. In some examples, an orthogonal projection of the first slotted area 201 on the second substrate 20 may be rectangular. However, this embodiment is not limited thereto.

In some exemplary implementation modes, as shown in FIG. 1 to FIG. 3, the first substrate 10 includes: a first base substrate 100, a ground layer 102 on one side of the first base substrate 100 close to the second substrate 20, and a feed structure layer 101 on one side of the first base substrate 100 away from the second substrate 20. An orthogonal projection of the ground layer 102 and the feed structure layer 101 on the second substrate 20 overlaps with an orthogonal projection of the first slotted area 201 on the second substrate 20. Orthogonal projections of the ground layer 102 and the feed structure layer 101 on the first base substrate 100 overlap with each other. The ground layer 102 has a second slotted area 103. An orthogonal projection of the second slotted area 103 on the second substrate 20 is within the orthogonal projection of the first slotted area 201 on the second substrate 20. An overlapping area between orthogonal projections of a radiation structure layer 301 and the feed structure layer 101 on the second substrate 20 overlaps with the orthogonal projection of the second slotted area 103 on the second substrate 20. In some examples, the orthogonal projection of the second slotted area 103 on the second substrate 20 may be rectangular. However, this embodiment is not limited thereto.

In some exemplary implementation modes, as shown in FIG. 2 and FIG. 3, the first substrate 10 further includes: a second electrode 105 on the side of the first base substrate 100 close to the second substrate 20. The second electrode 105 and the ground layer 102 may be in an integrated structure. However, this embodiment is not limited thereto.

In some exemplary implementation modes, the feed structure layer 101 includes: a feed part 1011, and grounding electrodes 1012 on two opposite sides of the feed part 1011. The feed part 1011 may be a strip-shaped micro-strip extending in a second direction Y. The grounding electrodes 1012 are on two opposite sides of the feed part 1011 in a first direction X. The grounding electrodes 1012 may be rectangular electrodes. An orthogonal projection of the feed part 1011 on the third base substrate 300 overlaps with the orthogonal projection of the radiation structure layer 301 on the third base substrate 300. An orthogonal projection of the grounding electrodes 1012 on the third base substrate 300 does not overlap with the orthogonal projection of the radiation structure layer 301 on the third base substrate 300. Multiple metalized via holes K1 are formed in the first base substrate 100. The grounding electrodes 1012 are electrically connected to the ground layer 102 through the multiple metalized via holes K1. For example, the grounding electrodes 1012 may be electrically connected to the ground layer 102 through four metalized via holes K1 arranged along the second direction Y. The antenna unit of this exemplary implementation mode uses a feed structure in a GCPW form. However, this embodiment is not limited thereto.

In some exemplary implementation modes, as shown in FIG. 1 and FIG. 2, in the first direction X, a center line of the feed part 1011 of the feed structure layer 101 substantially coincides with a center line of the second slotted area 103 of the ground layer 102, so as to ensure the impedance matching of a feed port of the antenna unit, and ensure the antenna performance.

In some exemplary implementation modes, as shown in FIG. 1 to FIG. 4, the first slotted area 201 of the second substrate 20 may expose a surface of the first substrate 10. The first slotted area 201 of the second substrate 20 exposes the second slotted area 103 of the ground layer 102 and part of the ground layer 102. After the first substrate 10 is in press bonding with the second substrate 20, the first substrate 10 and the first slotted area 201 of the second substrate 20 may form a groove for accommodating a liquid crystal material. In this exemplary implementation mode, a thickness of the liquid crystal layer may be determined by the thickness of the second substrate 20, so that the thickness of the liquid crystal layer that meets requirements on antenna performance can be achieved. An orthogonal projection of the second substrate 20 on the first substrate 10 may not overlap with the second electrode 105.

In some exemplary implementation modes, as shown in FIG. 1 to FIG. 5, the third substrate 30 includes: a third base substrate 300, and a radiation structure layer 301 on one side of the third base substrate 300 close to the second substrate 20. An orthogonal projection of the radiation structure layer 301 on the second substrate 20 is within the orthogonal projection of first slotted area 201 on the second substrate 20. An orthogonal projection of the radiation structure layer 301 on the first base substrate 100 covers an orthogonal projection of the second slotted area 103 of the ground layer 102 on the first base substrate 100, and overlaps with an orthogonal projection of the feed part 1011 of the feed structure layer 101 on the first base substrate 100. In some examples, the radiation structure layer 301 may include a rectangular radiation unit. However, this embodiment is not limited thereto.

In some exemplary implementation modes, as shown in FIG. 2 and FIG. 5, a first electrode 302 connected to the radiation structure layer 301 is further arranged on the side of the third base substrate 300 close to the second substrate 20. The first electrode 302 may be connected to the radiation structure layer 301 through multiple connecting parts (for example, four strip-shaped connecting parts). In some examples, the first electrode 302, the multiple connecting parts, and the radiation structure layer 301 may be in an integrated structure. However, this embodiment is not limited thereto. In some examples, the first electrode 302 and the radiation structure layer 301 may be made of different materials.

In some exemplary implementation modes, as shown in FIG. 2 to FIG. 5, the third substrate 30 may be arranged in a staggered manner with the second substrate 20 and the first substrate 10, so that orthogonal projections of the second substrate 20 and the first substrate 10 on the third substrate 30 do not overlap with the first electrode 302, and orthogonal projections of the second substrate 20 and the third substrate 30 on the first substrate 10 do not overlap with the second electrode 105. For example, the third substrate 30, the second substrate 20, and the first substrate 10 are staggered in the first direction X, so as to expose the first electrode 302 and the second electrode 105. The first electrode 302 and the second electrode 105 may be configured to be connected to a bias interface to apply bias signals.

In some exemplary implementation modes, as shown in FIG. 1 to FIG. 5, multiple through holes K2 are formed in the third base substrate 300. An orthogonal projection of the multiple through holes K2 on the second substrate 20 are within the orthogonal projection of the first slotted area 201 on the second substrate 20, and does not overlap with the orthogonal projection of the radiation structure layer 301 on the second substrate 20. That is, the orthogonal projections of the through holes K2 on the second substrate 20 are distributed in an area, where the radiation structure layer 301 does not overlap with the first slotted area 201, in the orthogonal projection of the first slotted area 201 on the second substrate 20. For example, four through holes K2 are formed in the third base substrate 300. The orthogonal projections of the fourth through holes K2 on the second base substrate 200 are at four corners of the first slotted area 201. In some examples, the through holes K2 may be circular through holes. However, in this embodiment, the number, the shapes, and the sizes of the through holes in the third base substrate 300 are not limited. In this exemplary implementation mode, the through holes K2 are formed in the third base substrate 300, which avoid cavity collapse caused by the bonding of substrates, and the through holes K2 in the third base substrate 300 may also serve as crystal filling ports for filling a liquid crystal material.

In some exemplary implementation modes, the radiation structure layer 301 and the ground layer 102 form an upper electrode and a lower electrode for controlling the liquid crystal layer 40 to work. When a resonant frequency of the antenna needs to be adjusted, bias signals may be applied through the first electrode 302 and the second electrode 105 to generate a voltage difference between the radiation structure layer 301 and the ground layer 102 to change an arrangement manner of liquid crystal molecules, so as to achieve an effect of adjusting the resonant frequency of the antenna.

Figure 6:
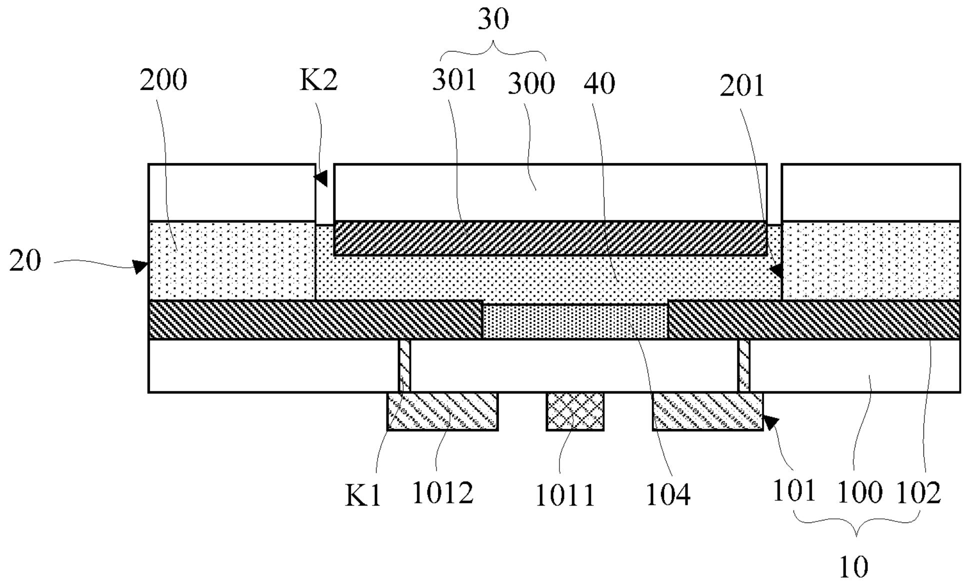
FIG. 6 illustrates another schematic cross-sectional view of an antenna unit of at least one embodiment of the present disclosure.

FIG. 6 illustrates another schematic cross-sectional view of an antenna unit of at least one embodiment of the present disclosure. In some exemplary implementation modes, as shown in FIG. 6, an insulating layer 104 is arranged on one side of the ground layer 102 away from the first base substrate 100. An orthogonal projection of the insulating layer 104 on the first base substrate 100 may include an orthogonal projection of the second slotted area 103 of the ground layer 102 on the first base substrate 100. In some examples, a material of the insulating layer 104 may be insulating ink. A thickness of the insulating layer 104 may be less than or equal to that of the ground layer 102. The insulating layer 104 is arranged in the second slotted area 103, which can avoid a cavity collapse caused by electrostatic adsorption in a bonding process of the substrates, so as to ensure the thickness of the liquid crystal layer 40. The rest of structures of the antenna unit of this embodiment may refer to the description of the foregoing embodiments, which will not be repeated herein.

Exemplary description is made below through a preparation process of the antenna unit. "A and B are arranged on a same layer" described in the present disclosure refers to that A and B are formed simultaneously through a same patterning process. In an exemplary embodiment of the present disclosure, "an orthogonal projection of A includes an orthogonal projection of B" refers to that a boundary of an orthogonal projection of B falls within a boundary of an orthogonal projection of A, or the boundary of the orthogonal projection of A overlaps with the boundary of the orthogonal projection of B.

In some exemplary implementation modes, a preparation process of the antenna unit may include the following operations.

(1) A first substrate is prepared.

In some exemplary implementation modes, this step may include: providing a double-sided copper clad substrate (including a first base substrate and copper foil layers covering two opposite surfaces of the first base substrate); forming multiple through holes penetrating through the first base substrate and each copper foil layer in the double-sided copper clad first base substrate, for example, the through holes are formed by laser drilling; performing electroplating treatment on the through holes, so as to form a conductive film on inner layers of the through holes, so as to form metalized via holes for electrically connecting the copper foil layers on the two surfaces, thereby achieving electrical connection between the copper foil layers on the two surfaces; and removing oxides and pollutants from the surfaces of the copper foil layers by a chemical method, so that the surfaces of the copper foil layers meet a roughness required for subsequent attaching of dry films. However, required patterns are etched in the copper foil layers on the two surfaces by an exposure development technology, so as to form a feed structure layer 101 and a ground layer 102. As shown in FIG. 3, the feed structure layer 101 includes: a feed part 1011, and grounding electrodes 1012 on two opposite sides of the feed part 1011. The grounding electrodes 1012 are connected to the ground layer 102 through multiple metalized via holes K1.

In some examples, the first base substrate 100 may be made of a material such as Polyimide (PI). The feed structure layer 101 and the ground layer 102 may be made of a metal material with good conductivity, such as copper (Cu). However, this embodiment is not limited thereto.

In some exemplary implementation modes, on the first base substrate 100 where the foregoing structures are formed, insulating ink is coated on a surface of the first base substrate 100 away from the feed structure layer 101 and the insulating ink is primarily cure after being pre-baked. The insulating ink is subjected to exposure development treatment and is completely cured through baking, so as to form an insulating layer 104. An orthogonal projection of the insulating layer 104 on the first base substrate 100 may cover an orthogonal projection of the second slotted area 103 of the ground layer 102 on the first base substrate 100. Arrangement of the insulating layer 104 can avoid a cavity collapse caused by electrostatic adsorption in a bonding process of the substrates.

(2) A second substrate is prepared.

In some exemplary implementation modes, windowing treatment is performed on the second base substrate 200, so as to form a first slotted area 201. In some examples, the second base substrate 200 may be made of a material such as Polyimide (PI). However, this embodiment is not limited thereto.

(3) A third substrate is prepared.

In some exemplary implementation modes, this step may include: providing a one-side copper clad substrate (including a third base substrate and a copper foil layer covering one surface of the third base substrate); and etching required patterns in the copper foil layer on one side by the exposure development technology, so as to form a feed structure layer 101, a first electrode 302, and multiple connecting parts. As shown in FIG. 5, the first electrode 302 is connected to the feed structure layer 101 through multiple connecting parts.

In some exemplary implementation modes, multiple through holes K2 (for example, four through holes K2) are formed in the third base substrate 300 where the foregoing structures are formed. The multiple through holes K2 may be adjacent to corner positions of the radiation structure layer 301. However, this embodiment is not limited thereto. Formation of the through holes K2 can avoid a cavity collapse caused by vacuum adsorption in a bonding process of the substrates.

(4) The first substrate, the second substrate, and the third substrate are bonded.

In some exemplary implementation modes, a transparent first alignment film is coated on the first substrate 10 where the foregoing patterns are formed. The first alignment film is cured, and alignment is performed on the cured first alignment film by using an alignment technology, so as to obtain a transparent first alignment layer. A transparent second alignment film is coated on the third substrate 30 where the foregoing patterns are formed. The second alignment film is cured, and alignment is performed on the cured second alignment film by using the alignment technology, so as to obtain a transparent second alignment layer. The first alignment layer covers the ground layer 102 of the first substrate 10. The second alignment layer covers the radiation structure layer 301 of the third substrate 30.

In some examples, the alignment technology may include: a friction alignment technology and an ultraviolet light alignment technology. A groove may be formed on a surface of the first alignment layer by the alignment technology, and is used for performing alignment on liquid crystal molecules, so that the liquid crystal molecules are arranged along a certain direction. A material of the first alignment film may be polyimide, polyamide, polyethylene, polystyrene, or polyvinyl alcohol. However, this embodiment is not limited thereto.

In some exemplary implementation modes, after the first alignment layer is formed on the first substrate 10, the first substrate 10 and the second substrate 20 may be bonded. The ground layer 102 of the first substrate 10 faces the second substrate 20. The second substrate 20 is on one side of the first substrate 10 close to the first alignment layer. The first substrate 10 and the second substrate 20 may be aligned and bonded.

In some exemplary implementation modes, after the first substrate 10 and the second substrate 20 are bonded, the third substrate 30 is bonded on the second substrate 20. The radiation structure layer 301 of the third substrate 30 faces the second substrate 20. After the third substrate 30 is bonded to the second substrate 20, the first substrate 10, the first slotted area of the second substrate 20, and the third substrate 30 form a cavity, and a liquid crystal material may be filled into the cavity through the through holes K2 of the third substrate 30, so as to form a liquid crystal layer 40. The radiation structure layer 301 and the ground layer 102 respectively form an upper electrode and a lower electrode for controlling operation of the liquid crystal layer 40.

In this exemplary implementation mode, the first substrate 10, the second substrate 20, and the third substrate 30 are staggered in a first direction X, so as to expose the first electrode 302 and the second electrode 105. Orthogonal projections of the third substrate 30 and the second substrate 20 on the first substrate 10 do not overlap with the second electrode 105. Orthogonal projections of the first substrate 10 and the second substrate 20 on the third substrate 30 do not overlap with the first electrode 302.

In this exemplary implementation mode, the first substrate 10 and the third substrate 30 are prepared by using a flexible circuit board preparation process, and a cavity for accommodating the liquid crystal material is formed by using the first slotted area of the second substrate 20, so as to ensure a thickness of the liquid crystal layer, and achieve an antenna design meeting performance requirements.

The preparation process of this exemplary embodiment may be implemented by using the existing mature preparation equipment, which has slight improvement on the existing processes, and can be well compatible with the existing preparation processes. The processes are easy to realize and easy to implement, the production efficiency is high, the production cost is low, and the yield is high.

The performance of the antenna unit of this embodiment is described below by multiple examples. In an example below, a plane dimension is a second length*a first length, wherein the second length is a length in the second direction Y, and the first length is a length in the first direction X. The first direction X and the second direction Y are in a same plane, and the first direction X is perpendicular to the second direction Y. In the present disclosure, a "thickness" may be a vertical distance between a surface of a film layer away from a substrate and a surface of the film layer close to the substrate.

Figure 7:
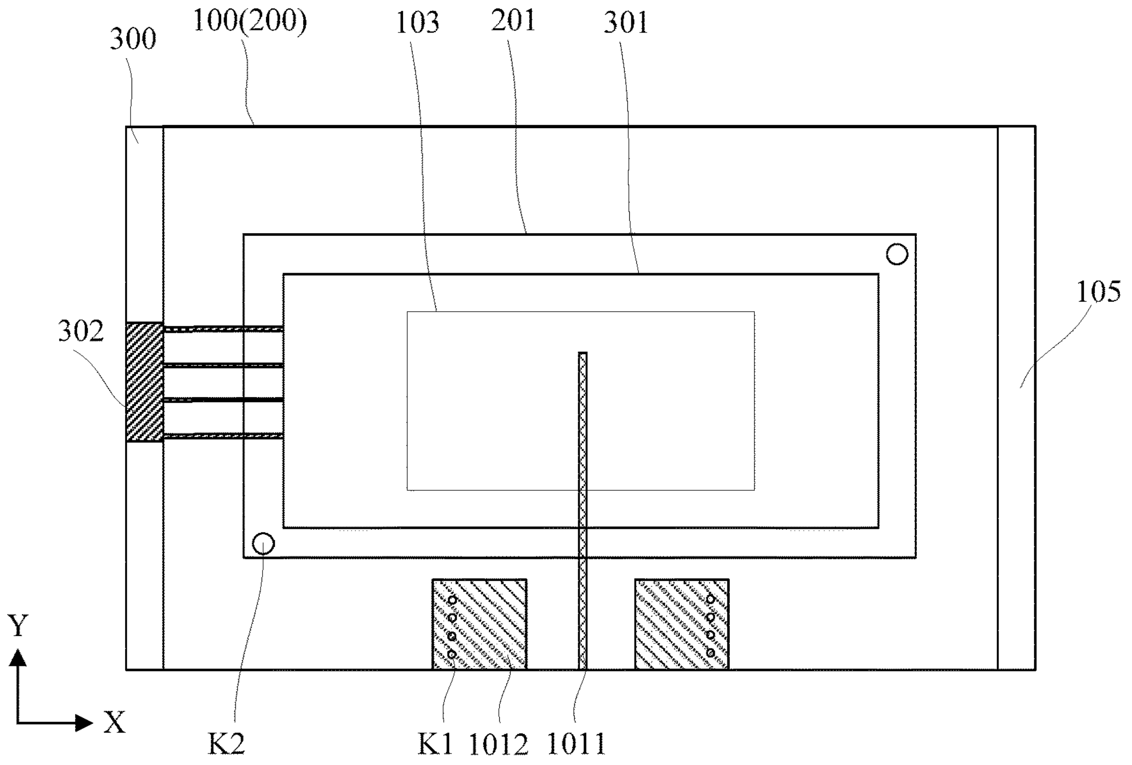
FIG. 7 illustrates another plane schematic diagram of an antenna unit of at least one embodiment of the present disclosure.

FIG. 7 illustrates another schematic cross-sectional view of an antenna unit of at least one embodiment of the present disclosure. As shown in FIG. 7, in a first example, two through holes K2 are formed in the third base substrate 300, and the two through holes K2 are on an extension line of a diagonal line of the radiation structure layer 301. Orthogonal projections of the two through holes K2 on the second substrate 20 is within the orthogonal projection of first slotted area 201 on the second substrate 20. The rest of structures of the antenna unit of the first example may refer to the description of the foregoing embodiments, which will not be repeated herein.

In the first example, a plane dimension of each of the first base substrate 100 and the third base substrate 300 may be about 30 mm*48 mm. A plane dimension of the second base substrate 200 may be about 30 mm*46 mm. A plane dimension of the radiation structure layer 301 is about 13.5 mm*33 mm, and a plane dimension of the first slotted area 201 of the second base substrate 200 is about 17.5 mm*37 mm. A plane dimension of the second slotted area 103 of the ground layer may be about 10 mm*19 mm. A plane dimension of the feed part 1011 is about 17.7 mm*0.25 mm. A plane dimension of each grounding electrode 1012 on the two sides of the feed part 1011 is about 5 mm*5 mm. A distance between the grounding electrode 1012 and the feed part 1011 is about 3 mm. The first base substrate 100, the second base substrate 200, and the third base substrate 300 may be made of Polyimide (PI) material. A thickness of the first base substrate 100 is about 109 μm, and a dielectric constant dk/dielectric loss df of the first base substrate 100 is about 3.38/0.015. A thickness of the second base substrate 200 is about 200 μm, and dk/df of the second base substrate 200 is about 3.52/0.01. A thickness of the third base substrate 300 is about 109 μm, and dk/df of the third base substrate 300 is about 3.38/0.015. A thickness of the liquid crystal layer 40 is about 200 μm. The ground layer 102, the feed structure layer 101, the radiation structure layer 301, and the first electrode 302 may be made of metal a material, such as copper (Cu), and the thickness thereof is about 18 μm. An overall dimension of the antenna is λ0*(0.35*0.58*0.005), where λ0 is a vacuum wavelength corresponding to a working frequency point 3.5 GHz. dk/df of the liquid crystal material in a vertical state is about 2.3616/0.0128, dk/df of the liquid crystal material in a flat state is about 3.0169/0.0035, and dk/df of the liquid crystal material in a mixed state is about 2.689/0.00815.

Simulation results of the antenna unit of the first example are as follows: resonant frequencies f0 of the liquid crystal layer in the vertical state, the flat state and the mixed state are 3.728 GHz, 3.358 GHz and 3.534 GHz respectively, corresponding gains G at f0 are 3.2 dBi, 3.28 dBi, and 3.2 dBi respectively, and corresponding radiation efficiencies at f0 are −2.24 dB, −1.9 dB, and −2.15 dB respectively. A frequency modulation range of the antenna unit of the first example is about 370 MHz, which can basically cover the frequency band n78 of 5G, and the antenna performance completely meets requirements of a mobile phone antenna.

A plane structure of an antenna unit of a second example may be shown with reference to FIG. 2. In the second example, the dk/df of the first base substrate 100 and the third base substrate 300 are about 3.1/0.006, and the rest of parameters may be the same as those of the first example.

Simulation results of the antenna unit of the second example are as follows: resonant frequencies f0 of the liquid crystal layer in the vertical state, the flat state and the mixed state are 3.744 GHz, 3.366 GHz, and 3.542 GHz respectively, corresponding gains G at f0 are 3.38 dBi, 3.43 dBi, and 3.34 dBi respectively, and corresponding radiation efficiencies at f0 are −1.04 dB, −0.59 dB, and −0.92 dB respectively. A frequency modulation range of the antenna unit of the second example is about 378 MHz, which can basically cover the frequency band n78 of 5G, and the antenna performance completely meets requirements of a mobile phone antenna. Compared with the first example, the radiation efficiency of the antenna can be significantly improved by using a dielectric material with low loss.

Figure 8:
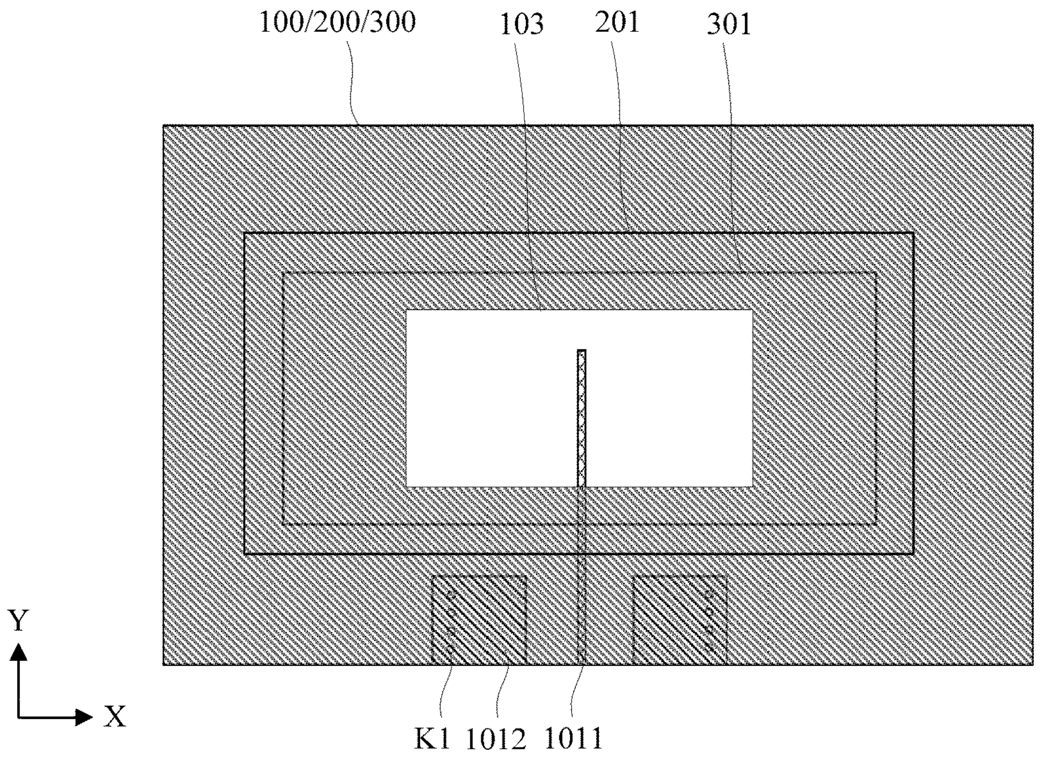
FIG. 8 illustrates another plane schematic diagram of an antenna unit of at least one embodiment of the present disclosure.

FIG. 8 illustrates another plane schematic diagram of an antenna unit of at least one embodiment of the present disclosure. As shown in FIG. 8, in a third example, no through hole or first electrode is formed on the third base substrate 300, and no second electrode is formed on the first base substrate 100. The first substrate 10, the second substrate 20, and the third substrate 30 are all aligned and arranged without staggering. The rest of structures of the antenna unit of the third example may refer to the description of the foregoing embodiments, which will not be repeated herein.

In the third example, a plane dimension of each of the first base substrate 100, the second base substrate 200, and the third base substrate 300 is about 30 mm*50 mm. A plane dimension of the radiation structure layer 301 is about 13.5 mm*33 mm. A plane dimension of the first slotted area 201 of the second base substrate 200 is about 17.5 mm*37 mm. A plane dimension of the second slotted area 103 of the ground layer 102 may be about 10 mm*19 mm. The rest of parameters of the antenna unit of the third example may be the same as those of the first example.

Simulation results of the antenna unit of the third example are as follows: resonant frequencies f0 of the liquid crystal layer in the vertical state, the flat state, and the mixed state are 3.732 GHz, 3.36 GHz and 3.534 GHz respectively, corresponding gains G at f0 are 3.27 dBi, 3.3 dBi, and 3.27 dBi respectively, and corresponding radiation efficiencies at f0 are −2.37 dB, −2.01 dB, and −2.26 dB respectively. A frequency modulation range of the antenna unit of the third example is about 372 MHz, which can basically cover the frequency band n78 of 5G, and the antenna performance completely meets requirements of a mobile phone antenna. Compared with the first example, the first electrode and the through holes formed in the third base substrate 300, and the second electrode arranged on the first base substrate 100 have no obvious influence on the antenna performance.

Figure 9:
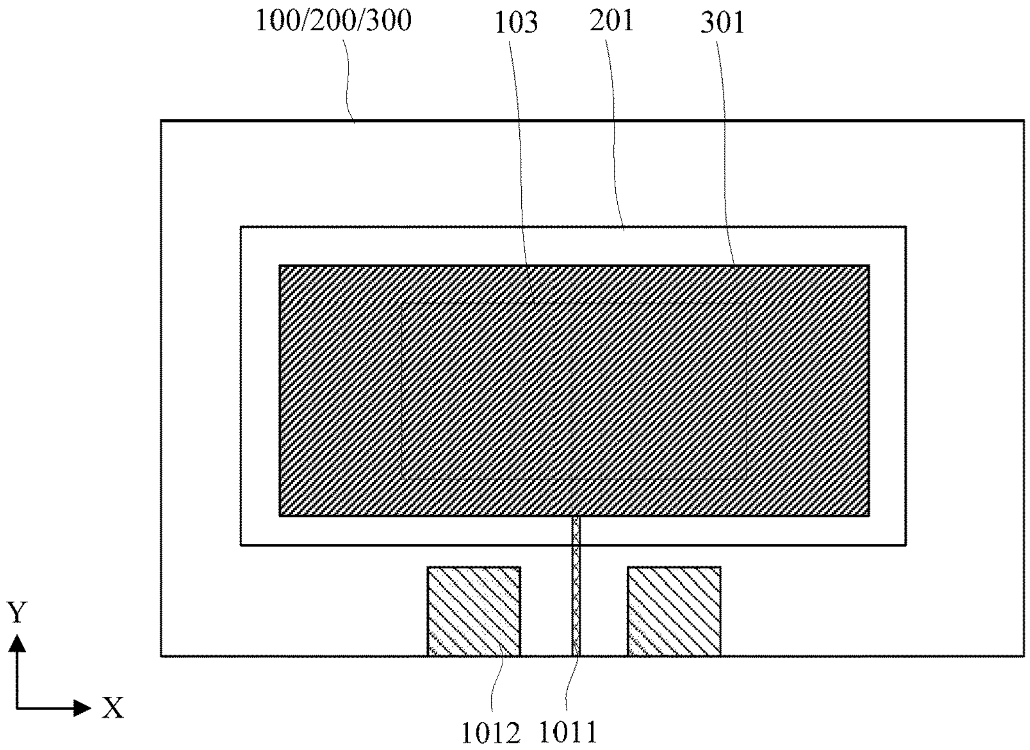
FIG. 9 illustrates another plane schematic diagram of an antenna unit of at least one embodiment of the present disclosure.

FIG. 9 illustrates another plane schematic diagram of an antenna unit of at least one embodiment of the present disclosure. As shown in FIG. 9, in a fourth example, no metalized via hole is formed in the first base substrate 100. The rest of structures of the antenna unit of the fourth example may refer to the description of the third example, and dimension parameters of the antenna unit of the fourth example may be the same as those of the third example, which will not be repeated herein.

Simulation results of the antenna unit of the fourth example are as follows: resonant frequencies f0 of the liquid crystal layer in the vertical state, the flat state, and the mixed state are 3.73 GHz, 3.356 GHz and 3.532 GHz respectively, corresponding gains G at f0 are 3.32 dBi, 3.4 dBi, and 3.32 dBi respectively, and corresponding radiation efficiencies at f0 are −2.35 dB, −1.98 dB, and −2.25 dB respectively. A frequency modulation range of the antenna unit of the fourth example is about 374 MHz, which can basically cover the frequency band n78 of 5G, and the antenna performance completely meets requirements of a mobile phone antenna. Compared with the third example, the metalized via holes formed in the first base substrate 100 have no obvious influence on the antenna performance.

Figure 10:
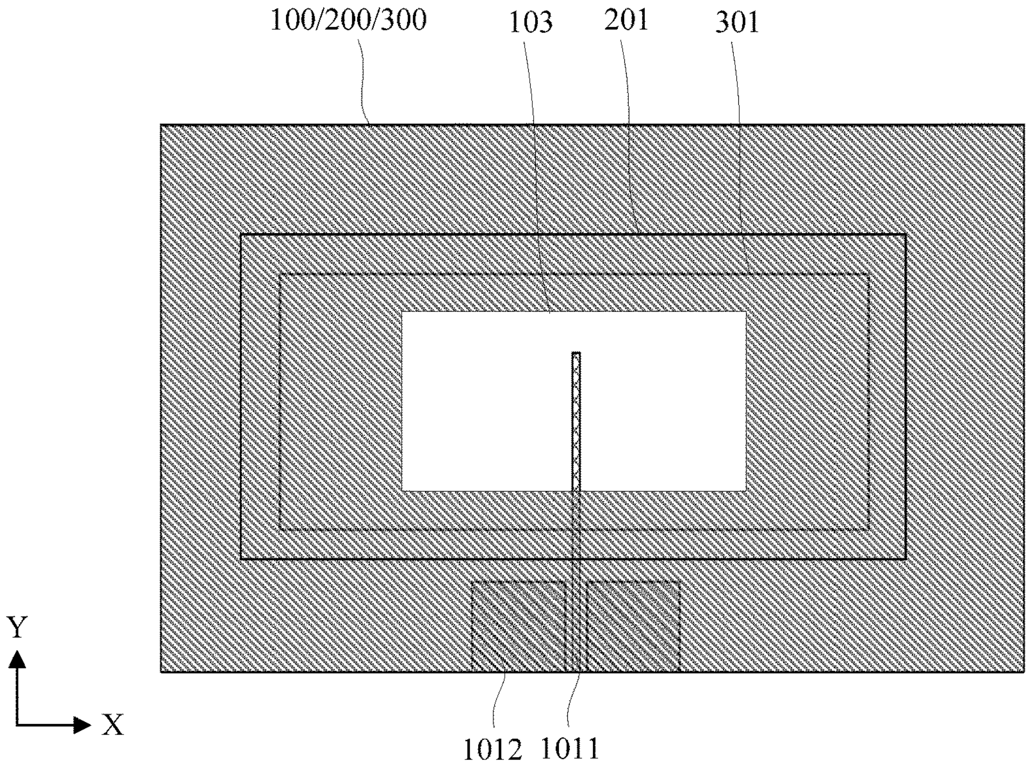
FIG. 10 illustrates another plane schematic diagram of an antenna unit of at least one embodiment of the present disclosure.

FIG. 10 illustrates another plane schematic diagram of an antenna unit of at least one embodiment of the present disclosure. As shown in FIG. 10, in a fifth example, a plane dimension of the feed part 1011 is about 17.7 mm*0.25 mm. A plane dimension of each grounding electrode 1012 is about 3 mm*3 mm. A distance between the grounding electrode 1012 and the feed part 1011 is about 0.2 mm. The rest of structures of the antenna unit of the fifth example may refer to the description of the fourth example, and the parameters of the antenna unit of the fifth example may be the same as those of the fourth example, which will not be repeated herein.

Simulation results of the antenna unit of the fifth example are as follows: resonant frequencies f0 of the liquid crystal layer in the vertical state, the flat state and the mixed state are 3.65 GHz, 3.282 GHz, and 3.448 GHz respectively, corresponding gains G at f0 are 3.01 dBi, 3.09 dBi, and 2.96 dBi respectively, and corresponding radiation efficiencies at f0 are −2.33 dB, −2.65 dB, and −2.58 dB respectively. A frequency modulation range of the antenna unit of the fifth example is about 368 MHz, which can partially cover the frequency band n78 of 5G, and the antenna performance completely meets requirements of a mobile phone antenna. Compared with the fourth example, although the dimension of the feed structure is changed, the antenna performance is about the same. The antenna unit of the fourth example is easier to prepare.

Figure 11:
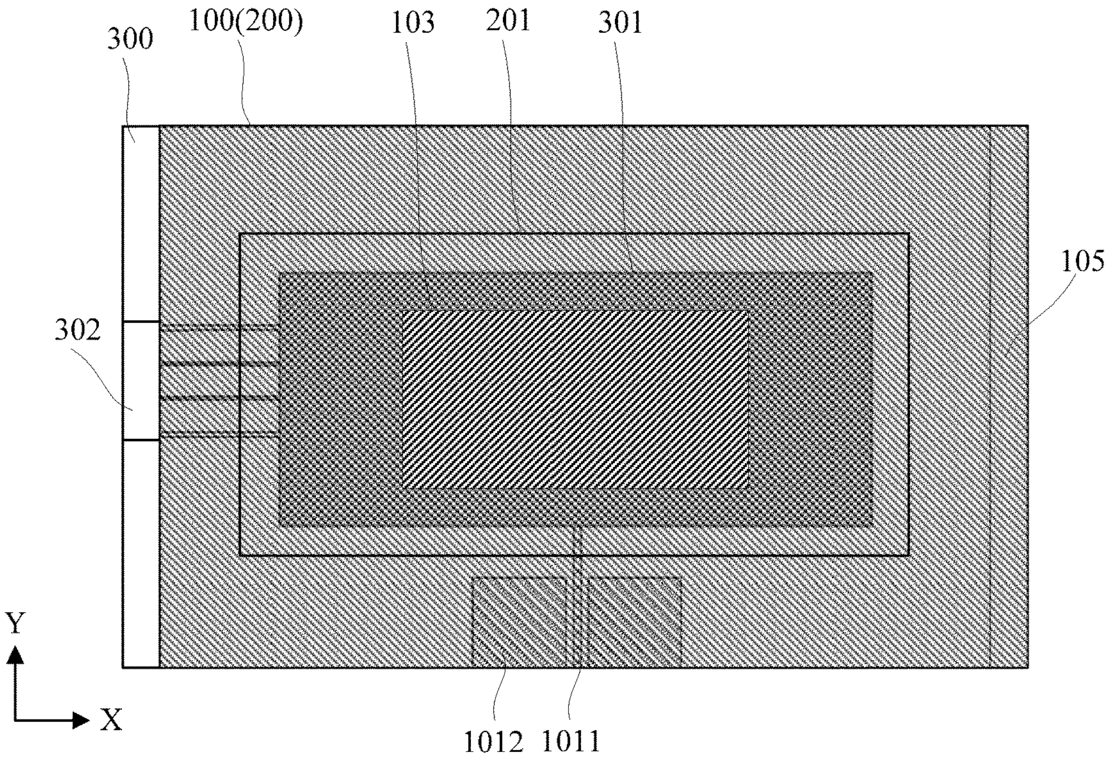
FIG. 11 illustrates another plane schematic diagram of an antenna unit of at least one embodiment of the present disclosure.

FIG. 11 illustrates another plane schematic diagram of an antenna unit of at least one embodiment of the present disclosure. As shown in FIG. 11, in a sixth example, a first electrode 302 connected to the feed structure layer 101 is arranged on the third base substrate 300, no through hole is formed in the third base substrate 300, and no metalized via hole is formed in the first base substrate 100. A second electrode 105 connected to the ground layer 102 is arranged on the first base substrate 100. The third substrate, the second substrate, and the first substrate are staggered in a staggered manner, so as to expose the first electrode 302 and the second electrode 105. The rest of structures of the antenna unit of the sixth example may refer to the description of the fifth example, and dimension parameters of the sixth example may be the same as those of the fifth example, which will not be repeated herein.

Simulation results of the antenna unit of the sixth example are as follows: resonant frequencies f0 of the liquid crystal layer in the vertical state, the flat state and the mixed state are 3.646 GHz, 3.276 GHz, and 3.442 GHz respectively, corresponding gains G at f0 are 2.95 dBi, 3.02 dBi, and 2.90 dBi respectively, and corresponding radiation efficiencies at f0 are −2.57 dB, −2.45 dB, and −2.57 dB respectively. A frequency modulation range of the antenna unit of the sixth example is about 376 MHz, which can partially cover the frequency band n78 of 5G, the antenna performance can completely meet requirements of a mobile phone antenna. Compared with the fifth example, the antenna performance is about the same. The arrangement of the first electrode and the second electrode has no obvious influence on the antenna performance.

Figure 12:
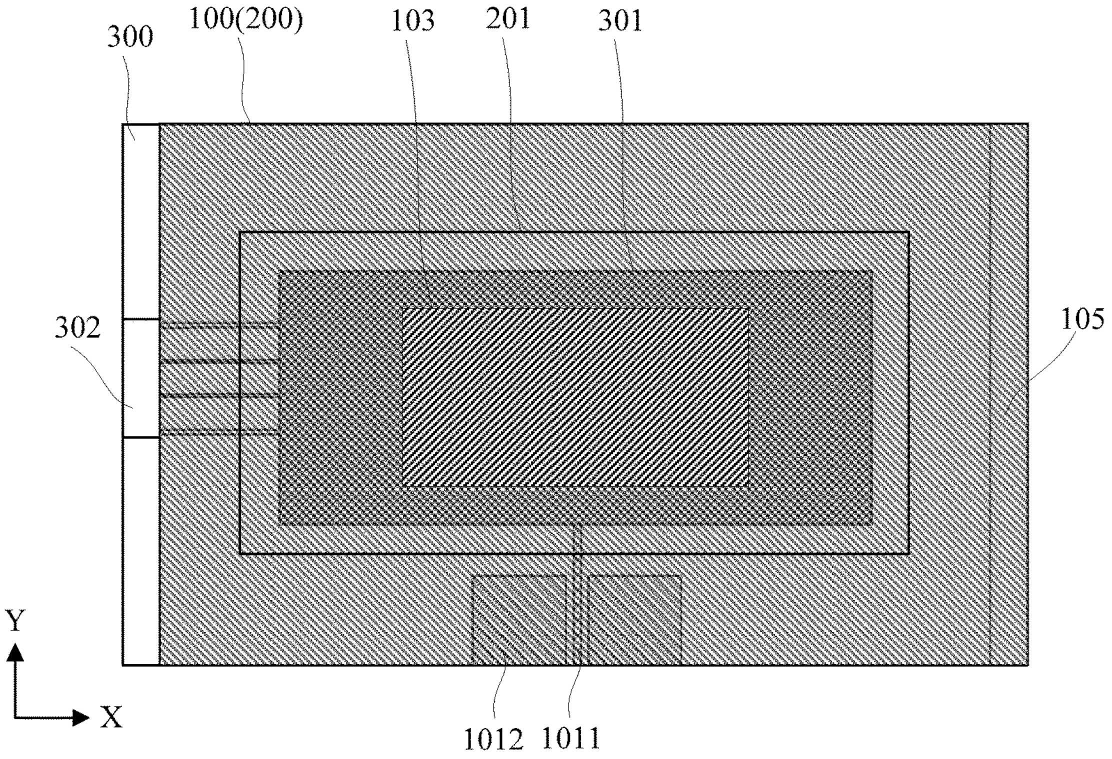
FIG. 12 illustrates another plane schematic diagram of an antenna unit of at least one embodiment of the present disclosure.

FIG. 12 illustrates another plane schematic diagram of an antenna unit of at least one embodiment of the present disclosure. As shown in FIG. 12, in a seventh example, the first electrode 302 on the third base substrate 300 is connected to the feed structure layer 101, the second electrode 105 on the first base substrate 100 is connected to the ground layer 102, and the first electrode 302 and the second electrode 105 may be made of Indium Tin Oxide (ITO) with a thickness of about 1 μm. The rest of structures and parameters of the antenna unit of the seventh example may refer to the description of the sixth example, which will not be repeated herein.

Simulation results of the antenna unit of the seventh example are as follows: resonant frequencies f0 of the liquid crystal layer in the vertical state, the flat state and the mixed state are 3.654 GHz, 3.278 GHz, and 3.45 GHz respectively, corresponding gains G at f0 are 2.93 dBi, 2.93 dBi, and 2.89 dBi respectively, and corresponding radiation efficiencies at f0 are −2.69 dB, −2.4 dB, and −2.59 dB respectively. A frequency modulation range of the antenna unit of the seventh example is about 376 MHz, which can partially cover the frequency band n78 of 5G, but the antenna performance can completely meet requirements of a mobile phone antenna. Compared with the sixth example, the change of the materials of the first electrode and the second electrode does not have obvious influence on the antenna performance.

A plane schematic diagram of an antenna unit of an eighth example may be as shown in FIG. 10. The structures of the antenna unit of the eighth example may refer to the description of the fifth example, which will not be repeated herein.

In the eighth example, the dk/df of the liquid crystal material in the vertical state is about 2.4527/0.0111, the dk/df of the liquid crystal material in the flat state is about 3.5821/0.006, and the dk/df of the liquid crystal material in the mixed state is about 3.0174/0.00855. The rest of parameters of the antenna unit of the eighth example may be the same as those of the fifth example.

Simulation results of the antenna unit of the eighth example are as follows: resonant frequencies f0 of the liquid crystal layer in the vertical state, the flat state and the mixed state are 3.904 GHz, 3.306 GHz, and 3.572 GHz respectively, corresponding gains G at f0 are 3.28 dBi, 2.2 dBi, and 2.72 dBi respectively, and corresponding radiation efficiencies at f0 are −2.76 dB, −2.98 dB, and −3.25 dB respectively. A frequency modulation range of the antenna unit of the eighth example is about 598 MHz, which can completely cover the frequency band n78 of 5G, and the antenna performance can completely meet requirements of a mobile phone antenna. Compared with the fifth example, the higher the tuning ratio of the liquid crystal material, the larger the tunable range of the antenna, but the radiation performance of the antenna is not obviously affected.

The antenna unit provided by this exemplary embodiment has advantages such as simple structure, light and thin appearance, continuous and reconfigurable tuning frequency, wide tuning range and can be applied to 5G terminal devices.

An embodiment further provides a method for preparing an antenna unit, including: forming a first substrate, wherein the first substrate includes: a first base substrate, and a feed structure layer and a ground layer on two opposite sides of the first base substrate; forming a second substrate with a first slotted area; forming a third substrate, wherein the third substrate includes: a third base substrate and a radiation structure layer; stacking the first substrate, the second substrate, and the third substrate, so that the second substrate is between the first substrate and the third substrate, wherein the ground layer faces the radiation structure layer, an orthogonal projection of the radiation structure layer on the second substrate is within the orthogonal projection of first slotted area on the second substrate, and orthogonal projections of the ground layer and the feed structure layer on the second substrate overlap with an orthogonal projection of first slotted area on the second substrate; and filling a liquid crystal material in a cavity formed by the first substrate, the first slotted area of the second substrate, and the third substrate, so as to form a liquid crystal layer.

In some exemplary implementation modes, stacking the first substrate, the second substrate, and the third substrate includes: pressing the third substrate, the second substrate, and the first substrate in a staggered manner, and exposing a first electrode which is arranged on the third base substrate and connected to the radiation structure layer and a second electrode which is arranged on the first base substrate and connected to the ground layer.

The method for preparing the antenna unit of this embodiment may refer to the description of the foregoing embodiments, which will not be repeated herein.

Figure 13:
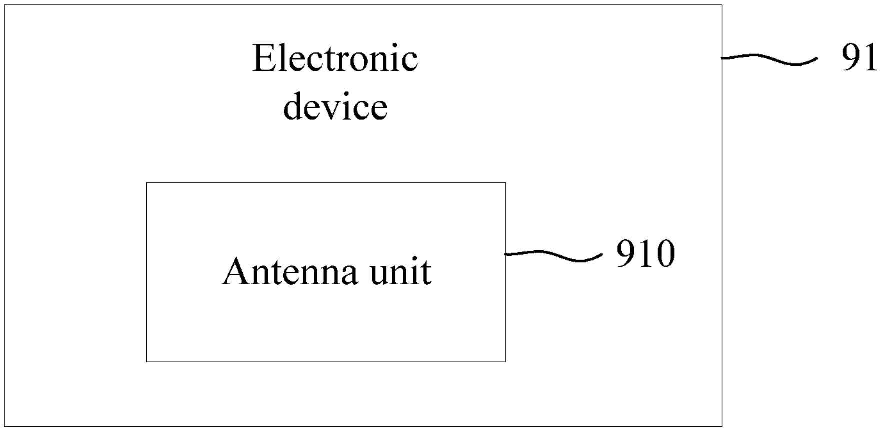
FIG. 13 illustrates a schematic diagram of an electronic device of at least one embodiment of the present disclosure.

FIG. 13 illustrates a schematic diagram of an electronic device of at least one embodiment of the present disclosure. As shown in FIG. 13, this embodiment provides an electronic device 91, including an antenna unit 910. The electronic device 91 may be: any product or part with a communication function, such as a mobile phone, a navigation apparatus, a game machine, a television (TV), a vehicular audio system, a tablet computer, a Personal Media Player (PMP), and a Personal Digital Assistant (PDA). However, this embodiment is not limited thereto.

The accompanying drawings in the present disclosure only relate to the structures related to the present disclosure, and other structures may refer to general designs. The embodiments of the present disclosure and features in the embodiments may be combined mutually to obtain new embodiments if there is no conflict.

Those of ordinary skills in the art should understand that modification or equivalent replacement may be made to the technical solutions of the present disclosure without departing from the spirit and scope of the technical solutions of the present disclosure, and should all fall within the scope of the claims of the present disclosure.

The invention claimed is:

1. An antenna unit, comprising:

a first substrate, a second substrate, and a third substrate which are stacked, wherein the second substrate has a first slotted area, and a liquid crystal layer is arranged in a cavity formed by the first substrate, the first slotted area of the second substrate, and the third substrate;

the first substrate comprises a first base substrate, a ground layer on one side of the first base substrate close to the second substrate, and a feed structure layer on one side of the first base substrate away from the second substrate, and an orthogonal projection of the ground layer and the feed structure layer on the second substrate overlaps with an orthogonal projection of the first slotted area on the second substrate; and the third substrate comprises a third base substrate, and a radiation structure layer on one side of the third base substrate close to the second substrate, and an orthogonal projection of the radiation structure layer on the second substrate is within the orthogonal projection of the first slotted area on the second substrate.

2. The antenna unit of claim 1, wherein the ground layer has a second slotted area; an orthogonal projection of the second slotted area on the second substrate is within the orthogonal projection of the first slotted area on the second substrate, and an overlapping area between the orthogonal projections of the radiation structure layer and the feed structure layer on the second substrate overlaps with the orthogonal projection of the second slotted area on the second substrate.

3. The antenna unit of claim 2, wherein the feed structure layer comprises: a feed part, and grounding electrodes on two opposite sides of the feed part, an orthogonal projection of the feed part on the second substrate overlaps with the orthogonal projection of the first slotted area on the second substrate;

a plurality of metalized via holes are formed in the first base substrate, and the grounding electrodes are electrically connected to the ground layer through the plurality of metalized via holes.

4. The antenna unit of claim 2, wherein at least one through hole is formed in the base third substrate, an orthogonal projection of the at least one through hole on the second substrate is within the orthogonal projection of the first slotted area on the second substrate, and does not overlap with the orthogonal projection of the radiation structure layer on the second substrate.

5. The antenna unit of claim 2, wherein an insulating layer is arranged on one side of the ground layer away from the first base substrate, and an orthogonal projection of the insulating layer on the first base substrate comprises an orthogonal projection of the second slotted area of the ground layer on the first base substrate.

6. The antenna unit of claim 1, wherein the feed structure layer comprises: a feed part, and grounding electrodes on two opposite sides of the feed part, an orthogonal projection of the feed part on the second substrate overlaps with the orthogonal projection of the first slotted area on the second substrate;

a plurality of metalized via holes are formed in the first base substrate, and the grounding electrodes are electrically connected to the ground layer through the plurality of metalized via holes.

7. The antenna unit of claim 6, wherein in a first direction, a center line of the feed part of the feed structure layer coincides with a center line of the second slotted area of the ground layer; and the first direction is perpendicular to an extension direction of the feed part.

8. The antenna unit of claim 7, wherein at least one through hole is formed in the base third substrate, an orthogonal projection of the at least one through hole on the second substrate is within the orthogonal projection of the first slotted area on the second substrate, and does not overlap with the orthogonal projection of the radiation structure layer on the second substrate.

9. The antenna unit of claim 7, wherein an insulating layer is arranged on one side of the ground layer away from the first base substrate, and an orthogonal projection of the insulating layer on the first base substrate comprises an orthogonal projection of the second slotted area of the ground layer on the first base substrate.

10. The antenna unit of claim 6, wherein at least one through hole is formed in the base third substrate, an orthogonal projection of the at least one through hole on the second substrate is within the orthogonal projection of the first slotted area on the second substrate, and does not overlap with the orthogonal projection of the radiation structure layer on the second substrate.

11. The antenna unit of claim 6, wherein an insulating layer is arranged on one side of the ground layer away from the first base substrate, and an orthogonal projection of the insulating layer on the first base substrate comprises an orthogonal projection of the second slotted area of the ground layer on the first base substrate.

12. The antenna unit of claim 1, wherein at least one through hole is formed in the base third substrate, an orthogonal projection of the at least one through hole on the second substrate is within the orthogonal projection of the first slotted area on the second substrate, and does not overlap with the orthogonal projection of the radiation structure layer on the second substrate.

13. The antenna unit of claim 1, wherein an insulating layer is arranged on one side of the ground layer away from the first base substrate, and an orthogonal projection of the insulating layer on the first base substrate comprises an orthogonal projection of the second slotted area of the ground layer on the first base substrate.

14. The antenna unit of claim 13, wherein a thickness of the insulating layer is less than or equal to a thickness of the ground layer.

15. The antenna unit of claim 1, wherein a first electrode connected to the radiation structure layer is further arranged on the side of the third base substrate close to the second substrate;

a second electrode connected to the ground layer is further arranged on the side of the first base substrate close to the second substrate;

orthogonal projections of the first substrate and the second substrate on the third substrate do not overlap with the first electrode; and orthogonal projections of the third substrate and the second substrate on the first substrate do not overlap with the second electrode.

16. The antenna unit of claim 15, wherein the first electrode and the radiation structure layer are in an integrated structure, and the second electrode and the ground layer are in an integrated structure.

17. The antenna unit of claim 1, wherein the first base substrate, a second base substrate of the second substrate, and the third base substrate are flexible substrates.

18. An electronic device, comprising an antenna unit, wherein the antenna unit comprises:

a first substrate, a second substrate, and a third substrate which are stacked, wherein the second substrate has a first slotted area, and a liquid crystal layer is arranged in a cavity formed by the first substrate, the first slotted area of the second substrate, and the third substrate;

the first substrate comprises a first base substrate, a ground layer on one side of the first base substrate close to the second substrate, and a feed structure layer on one side of the first base substrate away from the second substrate, and an orthogonal projection of the ground layer and the feed structure layer on the second substrate overlaps with an orthogonal projection of the first slotted area on the second substrate; and the third substrate comprises a third base substrate, and a radiation structure layer on one side of the third base substrate close to the second substrate, and an orthogonal projection of the radiation structure layer on the second substrate is within the orthogonal projection of the first slotted area on the second substrate.

19. A method for preparing an antenna unit, comprising:

forming a first substrate, wherein the first substrate comprises: a first base substrate, and a feed structure layer and a ground layer on two opposite sides of the first base substrate;

forming a second substrate having a first slotted area;

forming a third substrate, wherein the third substrate comprises: a third base substrate and a radiation structure layer;

stacking the first substrate, the second substrate, and the third substrate, so that the second substrate is located between the first substrate and the third substrate, the ground layer faces the radiation structure layer, an orthogonal projection of the radiation structure layer on the second substrate is within an orthogonal projection of first slotted area on the second substrate, and an orthogonal projection of the ground layer and the feed structure layer on the second substrate overlap with the orthogonal projection of first slotted area on the second substrate; and filling a liquid crystal material in a cavity formed by the first substrate, the first slotted area of the second substrate, and the third substrate, so as to form a liquid crystal layer.

20. The method of claim 19, wherein stacking the first substrate, the second substrate, and the third substrate comprises:

pressing the third substrate, the second substrate, and the first substrate in a staggered manner, and exposing a first electrode which is arranged on the third base substrate and connected to the radiation structure layer and exposing a second electrode which is arranged on the first base substrate and connected to the ground layer.

* * * * *